No. 673,738. Patented May 7, 1901.
J. F. SPONG.
SUNSHADE FOR HORSES.
(Application filed Feb. 21, 1901.)
(No Model.)
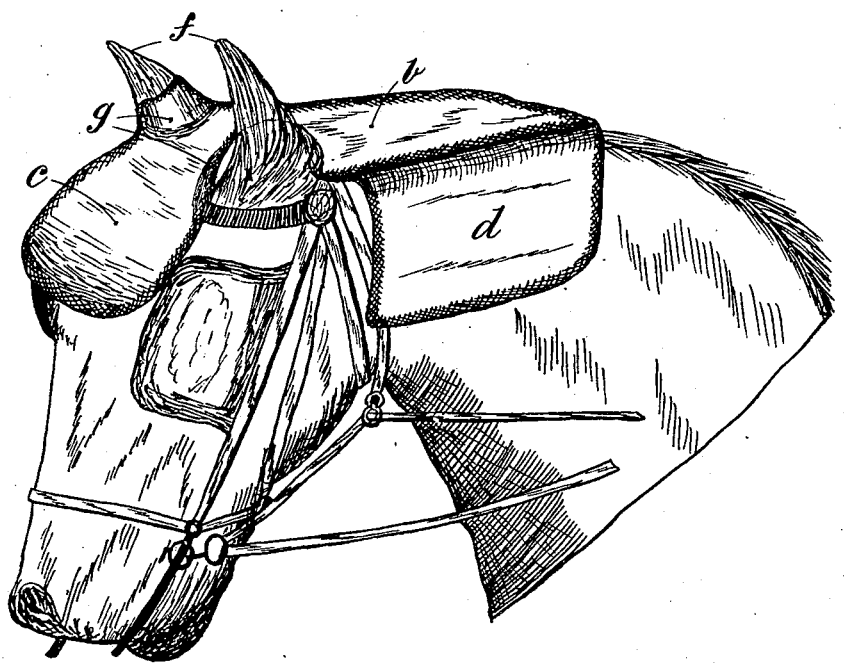
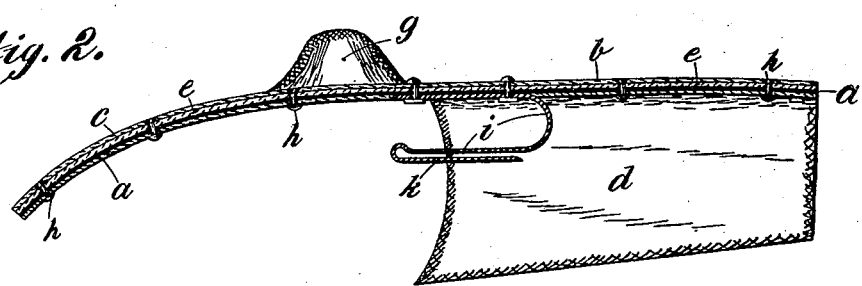
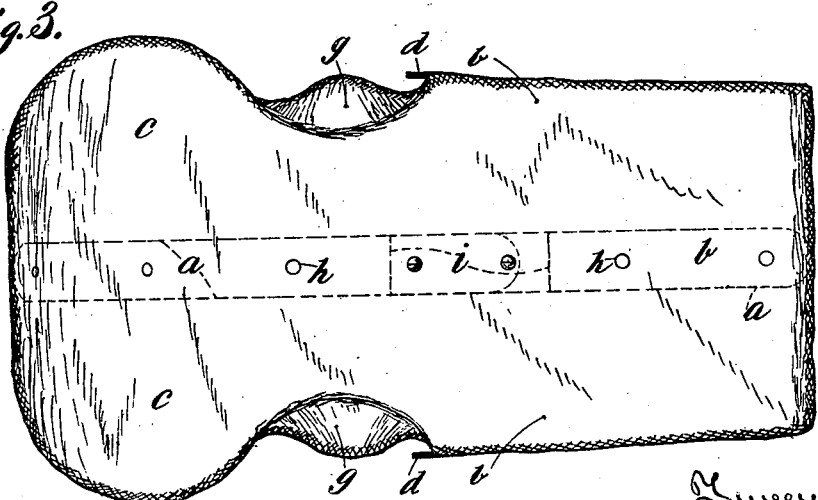

UNITED STATES PATENT OFFICE.

JOHN FULLER SPONG, OF COUNTY OF SURREY, ENGLAND.

SUNSHADE FOR HORSES.

SPECIFICATION forming part of Letters Patent No. 673,738, dated May 7, 1901.

Application filed February 21, 1901. Serial No. 48,361. (No model.)

*To all whom it may concern:*

Be it known that I, JOHN FULLER SPONG, a subject of the King of Great Britain, residing at 22 Peckham road, in the county of Surrey, England, have invented a certain new and useful Improvement in Sunshades for Horses; and I hereby declare the following be a to full, true, clear, and exact description of the invention, such as will enable others skilled in the art to which it appertains to make and use the same.

My invention relates to an improvement in shades used for protecting the heads of horses and other animals, such as mules or asses, from the rays of the sun; and the objects of my improvement are, first, to make the sunshade light and to enable it to be easily fixed in the required position; second, to allow its shape to be easily altered and adjusted, and, third, to afford effective protection to the head of the animal. I effect these objects by the means illustrated in the accompanying drawings, in which—

Figure 1 is a side view showing my improvement applied to a horse's head; Fig. 2 is a longitudinal section through the improved sunshade, and Fig. 3 is a view of the same from above.

Similar letters refer to similar parts in the several views.

$a$ is a strip or plate of light flexible but nonelastic metal or material, such as aluminium, upon which is fixed a piece of flexible material—such as felt, canvas, linen, or cloth—the back part of which, $b$, covers the top of the horse's head and neck behind the ears, while its front part $c$ covers the part of the head in front of the ears and between the blinkers, the part connecting $b$ and $c$ being curved in on each side, so as to fit between the ears $ff$, against which the edges of the curved part are turned up, as shown at $g$, so as to form a protection or guard to the lower part of the ears. The sides of the back part of the cover at $b$ are turned down at each side at $d$, so as to hang down and protect the sides of the head and neck behind the ears.

The parts $b$ and $c$ of the cover and the connecting part between them are formed of a double thickness of material, between which is fitted a stiffening-piece $e$, of similar shape, (shown in section in Fig. 2,) of pasteboard, canvas stiffened with shellac, or the like, to which the thicknesses of material are cemented, and the metal strip $a$ is arranged between the stiffening-piece $e$ and one of the thicknesses of material, as shown in section in Fig. 2, the whole being united by rivets $h$.

A metal hook $i$ of the shape shown in Fig. 2 is riveted or screwed to the lower side of the compound covering, the lower end of the hook being bent back at $k$, so as to form a clip, which can be pushed back from the front and fitted firmly upon the transverse strap which supports the blinkers, or, if blinkers are not used, upon the transverse head-strap of the harness. For greater steadiness two parallel hooks may be used instead of only one, both being attached to the lower side of the covering.

The entire device is steadily and conveniently supported at a sufficient distance above the horse's head, and the metal strip $a$, together with the front and back parts $b$ and $c$, can be easily bent to take the required shape, which they will retain without difficulty, while the sides $d$ hang freely down and afford the required protection without causing annoyance to the animal.

The device can be instantly removed and replaced and is very light, cheap, and simple.

What I claim as my invention, and desire to secure by Letters Patent, is—

1. The combination of the inelastic metal strip $a$, the parts $b$ and $c$ of the stiffened covering, the hanging sides $d$, and the hooked fastening $i$ attached to the strip $a$ and stiffened covering, substantially as set forth.

2. In combination with the metal strip $a$, stiffened covering $b$, $c$, and hooked fastening $i$, the turned-up edges $g$ protecting the lower part of the ears, substantially as set forth.

In witness whereof I have hereunto set my hand in the presence of two witnesses.

JOHN FULLER SPONG.

Witnesses:
E. EDWARDS,
ARTHUR E. EDWARDS.